US012587706B2

(12) United States Patent
Zhou et al.

(10) Patent No.: US 12,587,706 B2
(45) Date of Patent: *Mar. 24, 2026

(54) REBUFFERING REDUCTION IN ADAPTIVE BIT-RATE VIDEO STREAMING

(71) Applicant: Avago Technologies International Sales Pte. Limited, Singapore (SG)

(72) Inventors: Minhua Zhou, San Diego, CA (US); Xuemin Chen, Rancho Santa Fe, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/795,074

(22) Filed: Aug. 5, 2024

(65) Prior Publication Data

US 2024/0397141 A1 Nov. 28, 2024

Related U.S. Application Data

(63) Continuation of application No. 17/728,368, filed on Apr. 25, 2022, now Pat. No. 12,058,408.

(51) Int. Cl.
H04N 21/44 (2011.01)
H04N 21/437 (2011.01)
(Continued)

(52) U.S. Cl.
CPC ..... H04N 21/44004 (2013.01); H04N 21/437 (2013.01); H04N 21/439 (2013.01); H04N 21/44209 (2013.01); H04N 21/8456 (2013.01)

(58) Field of Classification Search
CPC .......... H04N 21/44004; H04N 21/437; H04N 21/439; H04N 21/44209; H04N 21/8456;
(Continued)

(56) References Cited

U.S. PATENT DOCUMENTS

| | | | |
|---|---|---|---|
| 7,711,841 B2 | 5/2010 | Deshpande | |
| 9,426,543 B1 * | 8/2016 | Li | ...................... H04N 21/8586 |

(Continued)

FOREIGN PATENT DOCUMENTS

| | | |
|---|---|---|
| EP | 1872537 B1 | 1/2008 |
| WO | 2017095276 A1 | 6/2017 |
| WO | 2021167531 A1 | 8/2021 |

OTHER PUBLICATIONS

Extended European Search Report, EP App. No. 25184383.5, Jul. 16, 2025.

*Primary Examiner* — Gigi L Dubasky
(74) *Attorney, Agent, or Firm* — King Intellectual Asset Management

(57) ABSTRACT

A method includes setting, by a controller, a first bit-rate level for a next video segment, and comparing a fill level of a playback buffer to a first threshold. If the fill level of the playback buffer satisfies the first threshold, the first bit-rate level for the next video segment is replaced by setting a second bit-rate level for the next video. A first request is issued to a server for the next video segment encoded at the first bit-rate level or, if the fill level of the playback buffer satisfies the first threshold, encoded at the second bit-rate level and downloading of the requested next video segment and storing the requested video segment in the playback buffer. A decoder decodes the next video segment from the playback buffer for playback on a display device after the next video segment has been downloaded and stored in the playback buffer.

20 Claims, 11 Drawing Sheets

(51) Int. Cl.
    *H04N 21/439*     (2011.01)
    *H04N 21/442*     (2011.01)
    *H04N 21/845*     (2011.01)

(58) Field of Classification Search
    CPC ......... H04N 21/23439; H04N 21/4424; H04N
        21/4621; H04N 21/6377; H04N 21/6373;
        H04N 21/6379; H04N 21/462; H04L
        65/612; H04L 65/613; H04L 65/756;
        H04L 65/762; H04L 65/80; H04L 47/267;
        H04L 47/38; H04L 47/263; H04L 47/30
    See application file for complete search history.

(56) References Cited

U.S. PATENT DOCUMENTS

| | | | |
|---|---|---|---|
| 10,547,883 B2 | 1/2020 | Do et al. | |
| 12,058,408 B2* | 8/2024 | Zhou | H04N 21/44004 |
| 2004/0156624 A1 | 8/2004 | Kent, Jr. et al. | |
| 2011/0122939 A1 | 5/2011 | Ganesan et al. | |
| 2011/0138427 A1 | 6/2011 | Shen et al. | |
| 2011/0273985 A1 | 11/2011 | Siemens et al. | |
| 2014/0068008 A1* | 3/2014 | Tzhori | H04L 47/37 |
| | | | 709/219 |
| 2014/0317241 A1 | 10/2014 | Zhao et al. | |
| 2014/0347989 A1 | 11/2014 | Shen et al. | |
| 2015/0033277 A1 | 1/2015 | Li et al. | |
| 2015/0326899 A1* | 11/2015 | Setos | H04N 21/274 |
| | | | 725/25 |

* cited by examiner

REBUFFERING REDUCTION IN ADAPTIVE BIT-RATE VIDEO STREAMING

CROSS-REFERENCE TO RELATED APPLICATIONS

This application is a continuation of application Ser. No. 17/728,368 titled REBUFFERING REDUCTION IN ADAPTIVE BIT-RATE VIDEO STREAMING and filed on Apr. 25, 2022, the entirety of which is incorporated herein by reference for all purposes.

TECHNICAL FIELD

The present description relates in general to video streaming including, for example, adaptive bit-rate video streaming.

BACKGROUND

Internet-based video technologies may rely on Hypertext Transfer Protocol (HTTP) based adaptive streaming. This class of protocols has been standardized under the umbrella of Dynamic Adaptive Streaming over HTTP (DASH). In DASH systems, video content is divided into multiple segments or chunks, each segment or chunk corresponding to a period of playback time. The video content is encoded at multiple discrete bit-rates and the segments or chunks from different bit-rate streams are aligned so that a video player can switch to a different bit-rate at a chunk boundary in response to changes in network bandwidth conditions.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

Internet-based video technologies may rely on Hypertext Transfer Protocol (HTTP) based adaptive streaming. This class of protocols has been standardized under the umbrella of Dynamic Adaptive Streaming over HTTP (DASH). In DASH systems, video content is divided into multiple segments or chunks, each segment or chunk containing a portion of video content data corresponding to a period of playback time (e.g., 2 seconds, 5 seconds, 10 seconds, etc.). The term "playback" refers to the presentation of decoded video content, which may include both visual content and audio content, on a display device which may be a television, a laptop, a tablet, a smartphone, etc. The video content is encoded at multiple discrete bit-rate levels and the segments or chunks from different bit-rate streams are aligned so that a video player can switch to a different bit-rate level at a chunk boundary in response to changes in network bandwidth conditions. The bit-rate level indicates an amount of data per unit time (e.g., megabits per second) at which the video content is encoded and which should be accommodated by available network bandwidth for uninterrupted streaming of the video content. The increased amount of data provided by higher bit-rate levels may be used to improve the quality of the streamed video content by increasing resolution and/or increasing frame rate, for example. The terms "segment" and "chunk" are used interchangeably herein.

Figure 1:
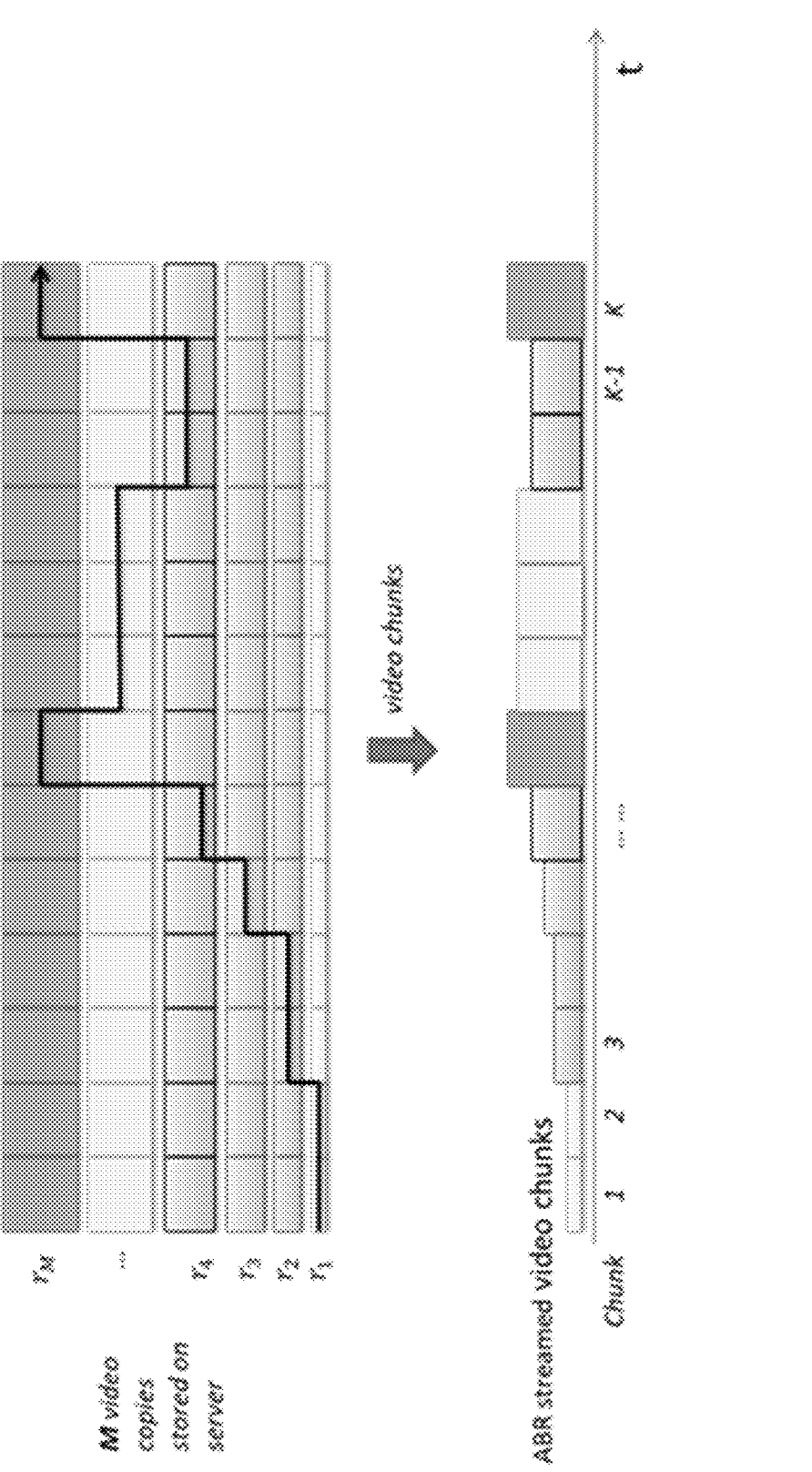
FIG. 1 is a diagram illustrating adaptive bit-rate streaming of video content according to aspects of the subject technology.

For example, FIG. 1 is a diagram illustrating adaptive bit-rate streaming of video content according to aspects of the subject technology. As depicted in FIG. 1, M copies of video content are stored on a server. Each copy of the video content is divided into K segments or chunks and is encoded at a different respective bit-rate level from a set of available bit-rate levels $R=\{r_1, r_2, \ldots, r_M\}$ resulting in M streams of the video content being stored on the server encoded at different respective bit-rate levels. The bold line drawn through the various streams of the video content represents an example path illustrating changes in bit-rate levels made while streaming the video content. The streamed K segments or chunks of the video content encoded at the different bit-rate levels are arranged along the timeline illustrated at the bottom of FIG. 1.

The Quality of Experience (QoE) plays a critical role in Internet video applications, as it ultimately affects revenue streams for content providers. Specifically, metrics such as the duration of rebuffering (i.e., the player's playback buffer does not have content to play), startup delay (i.e., the lag between the user clicking vs. the time to begin playback), the average playback bit-rate, and the variability of the bit-rate delivered have emerged as key factors. Among all those factors, the rebuffering time is of top importance as too long or too frequent rebuffering may cause users to abandon watching the current channel and switch to other programs.

The subject technology proposes control algorithms designed to reduce both the amount of rebuffering time and the frequency of rebuffering events during adaptive bit-rate streaming of video content. According to aspects of the subject technology, a control algorithm is introduced on top of an existing ABR control algorithm that may replace bit-rate level decisions made by the ABR control algorithm based on fill levels of a playback buffer in order to reduce rebuffering time and frequency. Alternatively, or in addition to, another control algorithm may be employed that controls a playback speed of the video content during streaming based on fill levels of the playback buffer in order to reduce rebuffering time and frequency. These control algorithms and their associated improvements are discussed in more detail below.

Figure 2:
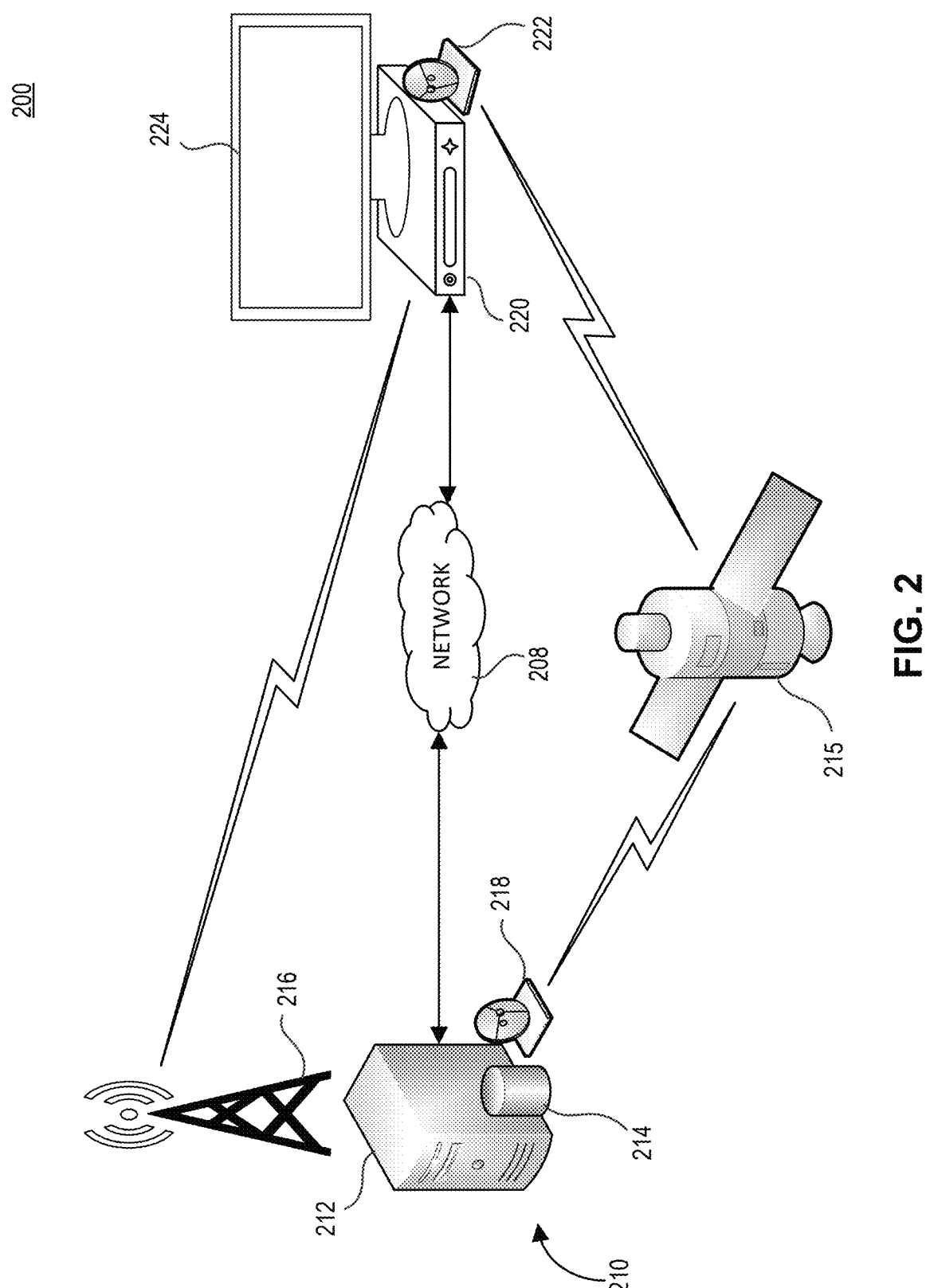
FIG. 2 illustrates an example of a network environment 200 in which an ABR video streaming system may be implemented in accordance with aspects of the subject technology.

FIG. 2 illustrates an example of a network environment 200 in which an ABR video streaming system may be implemented in accordance with aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be employed.

The example network environment 200 includes content delivery network (CDN) 210 that is communicably coupled to electronic device 220, such as by network 208. CDN 210 may include, and/or may be communicably coupled to, content server 212, antenna 216, and/or satellite transmitting device 218. Content server 212 can encode and/or transmit encoded data streams, such as MPEG AVC (Advanced Video Coding)/ITU-T H.264 encoded video streams, MPEG HEVC (High-Efficiency Video Coding)/ITU-T H.265 encoded video streams, VP9 encoded video streams, AOM AV1 encoded video streams, and/or MPEG VVC (Versatile Video Coding)/ITU-T H.266 encoded video streams, over network 208. Antenna 216 transmits encoded data streams over the air, and satellite transmitting device 218 can transmit encoded data streams to satellite 215.

Electronic device 220 may include, and/or may be coupled to, satellite receiving device 222, such as a satellite dish, that receives encoded data streams from satellite 215. In one or more implementations, electronic device 220 may further include an antenna for receiving encoded data streams, such as encoded video streams, over the air from antenna 216 of the CDN 210. Content server 212 and/or electronic device 220 may be, or may include, one or more components of the electronic system discussed below with respect to FIGS. 3, 6, 8, and/or 11.

Network 208 may be a public communication network (such as the Internet, a cellular data network or dial-up modems over a telephone network) or a private communications network (such as private local area network (LAN) or leased lines). Network 208 may also include, but is not limited to, any one or more of the following network topologies, including a bus network, a star network, a ring network, a mesh network, a star-bus network, a tree or hierarchical network, and the like. In one or more implementations, network 208 may include transmission lines, such as coaxial transmission lines, fiber optic transmission lines, or generally any transmission lines, that communicatively couple content server 212 and electronic device 220.

Content server 212 may include, or may be coupled to, one or more processing devices, data store 214, and/or an encoder. The one or more processing devices execute computer instructions stored in data store 214, for example, to implement a content delivery network. Data store 214 may store the computer instructions on a non-transitory computer-readable medium. Data store 214 may further store multiple copies of video content encoded at different respective bit-rate levels that are delivered by CDN 210. An encoder may use a codec to encode video streams, such as an AVC/H.264 codec, an HEVC/H.265 codec, a VP9 codec, an AV1 codec, a VVC/H.266 codec, or any other suitable codec.

In one or more implementations, content server 212 may be a single computing device such as a computer server. Alternatively, content server 212 may represent multiple computing devices that are working together to perform the actions of a server computer (such as a cloud of computers and/or a distributed system). Content server 212 may be coupled with various databases, storage services, or other computing devices, such as an adaptive bit rate (ABR) server, that may be collocated with content server 212 or may be disparately located from content server 212.

Electronic device 220 may include, or may be coupled to, one or more processing devices, a memory, and/or a decoder, such as a hardware decoder. Electronic device 220 may be any device that is capable of decoding an encoded data stream, such as a VVC/H.266 encoded video stream.

In one or more implementations, electronic device 220 may be, or may include all or part of, a laptop or desktop computer, a smartphone, a tablet device, a wearable electronic device such as a pair of glasses or a watch with one or more processors coupled thereto and/or embedded therein, a set-top box, a television or other display with one or more processors coupled thereto and/or embedded therein, video game console, or other electronic devices that can be used to receive and decode an encoded data stream, such as an encoded video stream.

In FIG. 2, electronic device 220 is depicted as a set-top box, e.g., a device that is coupled to, and is capable of displaying video content on display 224, such as a television, a monitor, or any device capable of displaying video content. In one or more implementations, electronic device 220 may be integrated into display 224 and/or display 224 may be capable of outputting audio content in addition to video content. Electronic device 220 may receive streams from CDN 210, such as encoded data streams, that include video content items, such as television programs, movies, or generally any content items. Electronic device 220 may receive the encoded data streams from the CDN 210 via antenna 216, via network 208, and/or via satellite 215, and decode the encoded data streams, e.g., using a hardware decoder.

Figure 3:
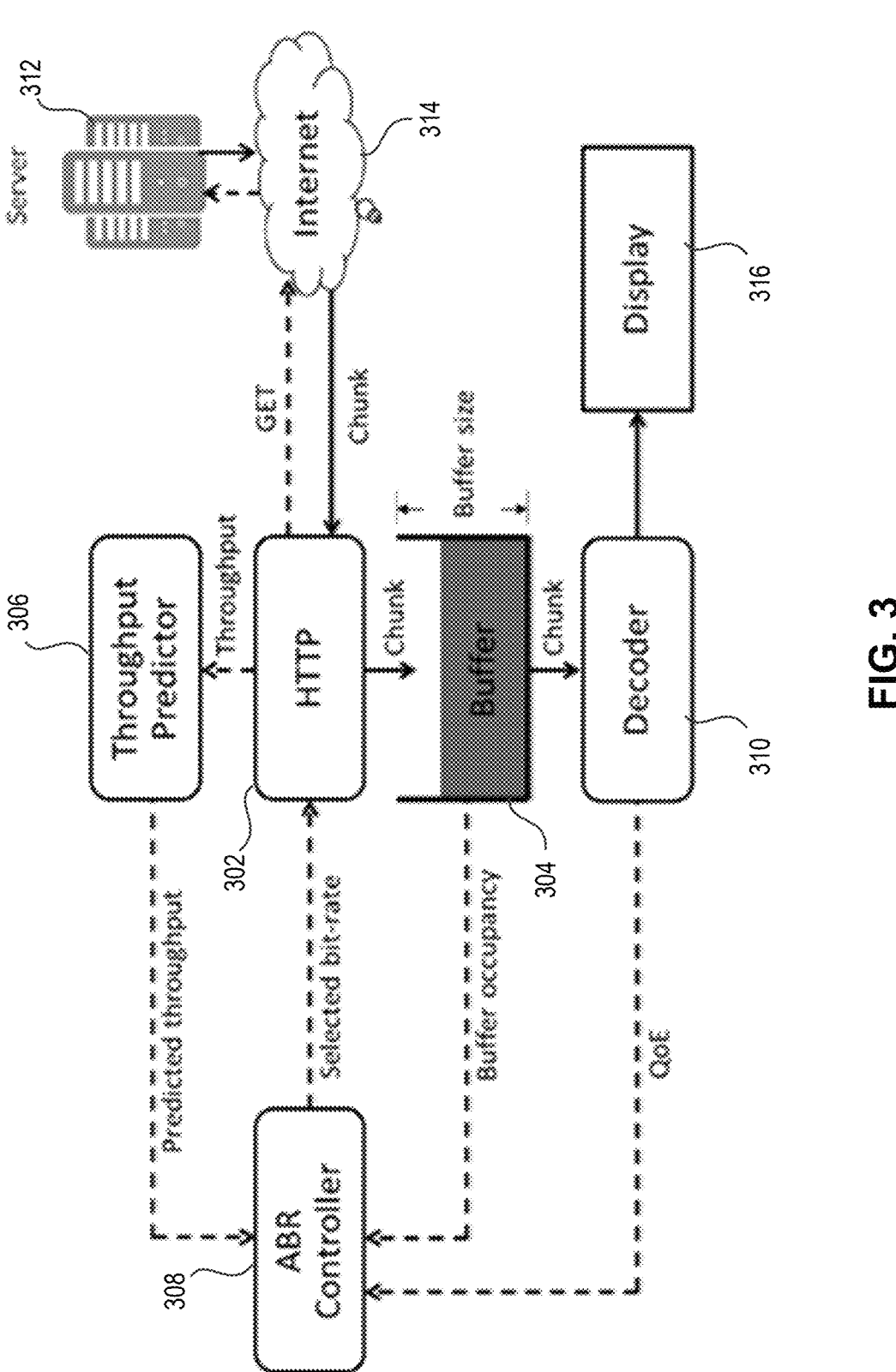
FIG. 3 is a block diagram illustrating components of an electronic device according to aspects of the subject technology.

FIG. 3 is a block diagram illustrating components of an electronic device, such as electronic device 220 represented in FIG. 2, according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

The electronic device (e.g., adaptive video player) depicted in FIG. 3 includes HTTP engine 302, playback buffer 304, throughput predictor 306, ABR controller 308, and decoder 310. According to aspects of the subject technology, HTTP engine 302 issues requests ("GET") to server 312 via network 314 (e.g., the Internet) for chunks of video content encoded at a selected bit-rate level. HTTP engine 302 downloads the requested chunks from server 312 via network 314 and stores the chunks in playback buffer 304. HTTP engine 302 also may report the network throughput (i.e., bandwidth) experienced while downloading the chunks from server 312.

ABR controller 308 selects bit-rate levels for the next chunk(s) to be downloaded by HTTP engine 302 and notifies HTTP engine 302 of the selections. ABR controller 308 makes the bit-rate level selections based on one or more inputs received from other components of the electronic device. For example, throughput predictor 306 estimates the network bandwidth expected to be available for downloading the next chunk based on the previous bandwidth measures delivered by HTTP engine 302 to throughput predictor 306. Playback buffer 304 reports or makes available for querying a fill level of the playback buffer in terms of the amount of playback time available from the chunks of video content buffered in the playback buffer. Other metrics such as the number of chunks or video segments buffered in the playback buffer, for example, may be used to measure the fill level of the playback buffer. One or both of the estimated network bandwidth and the fill level of the playback buffer may be used by ABR controller 308 to make bit-rate level selections. ABR controller 308 also may use other inputs in addition to or in place of the two inputs described above.

Decoder 310 consumes and decodes chunks of video content from playback buffer 304 and provides the decoded video content to display 316 for playback of the video content to viewer. Decoder 310 also may report user-perceived Quality-of-Experience (QoE) scores to assist the decision-making logic in ABR controller 308. Examples of the processes summarized above are explained in more detail in the description provided below.

Each of the components depicted in FIG. 3, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or may be implemented as a combination of both.

Figure 4:
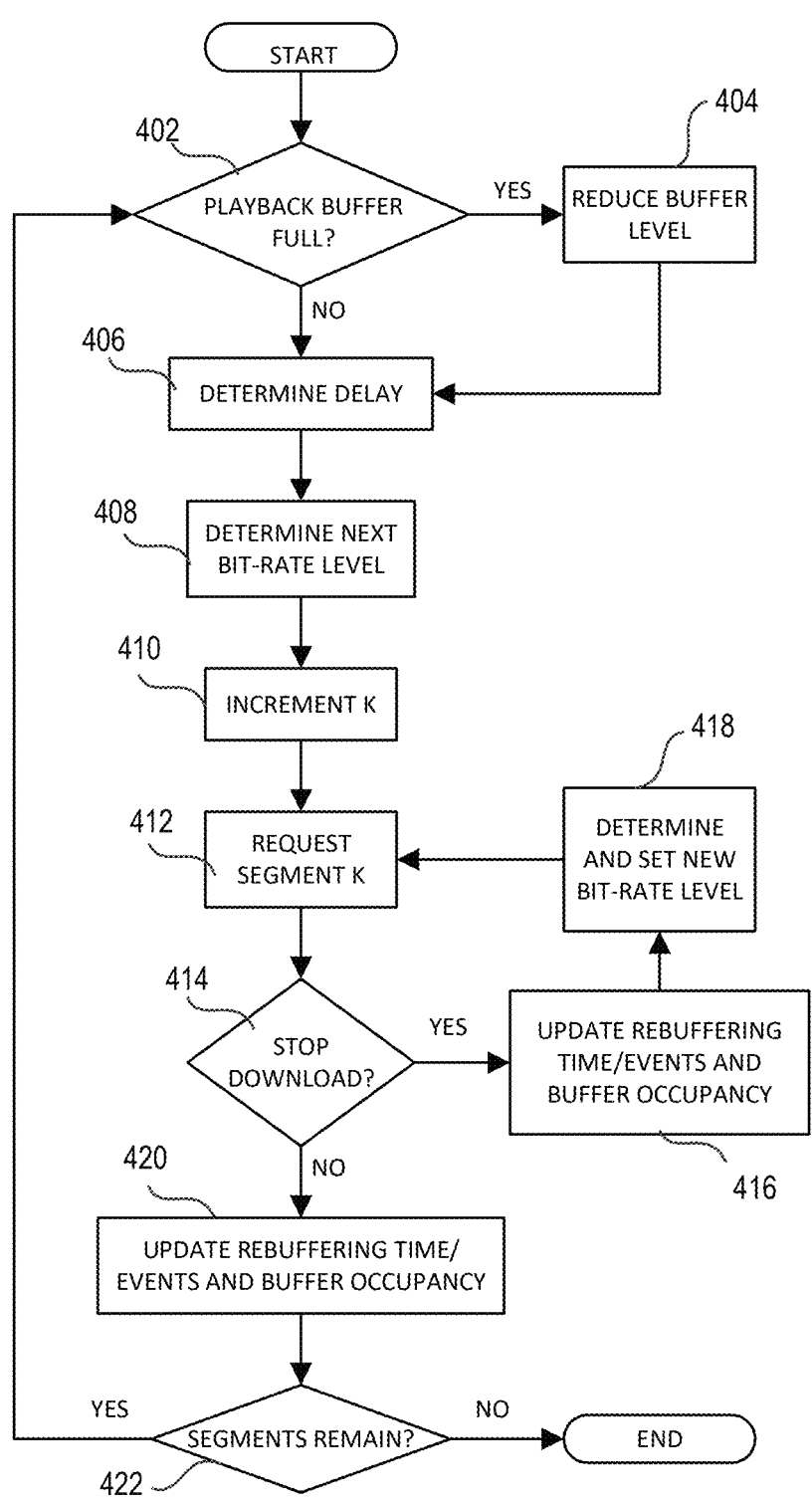
FIG. 4 is a flowchart illustrating an example adaptive bit-rate streaming process according to aspects of the subject technology.

FIG. 4 is a flowchart illustrating an example adaptive bit-rate streaming process according to aspects of the subject technology. For explanatory purposes, the blocks of the process illustrated in FIG. 4 are described herein as occurring in serial, or linearly. However, multiple blocks of the process may occur in parallel. In addition, the blocks of the process need not be performed in the order shown and/or one or more blocks of the process need not be performed and/or can be replaced by other operations.

For purposes of describing the process illustrated in FIG. 4, downloaded video content is modeled as a set of consecutive video segments or chunks, $V=\{1, 2, \ldots, K\}$, where L is the segment time (i.e., each segment contains L seconds of video). Multiple copies of the video content are stored on the server where each copy is encoded at a different bit-rate selected from the set of available bit rate levels, $\Re=\{r_1, r_2, \ldots, r_M\}$, where $r_1 < r_2 < \ldots, < r_M$. The adaptive video player may choose to download video segment k at a selected bit-rate level $R_k \in \Re$. $B(t) \in [0, B_{max}]$ is the fill level at time t (i.e., the play time of the video content remaining in the playback buffer), $B_{max}$ is the maximum amount of playback time of video content that can be buffered in the playback buffer. $B_k=B(t_k)$ represents the fill level of the playback buffer at the time $t_k$, which is the time at which the adaptive video player begins to download video segment k from the server.

At the start of the process in FIG. 4, tracking parameters total_rebuffering_time (tr_time) and total_rebuffering_events (tr_events) are both reset to zero. Total_rebuffering_time keeps track of the total amount of time the adaptive video player spends rebuffering during playback of the video content, and therefore not playing back video, to add one or more video segments to the playback buffer in response to the playback buffer being emptied by the decoder. Total_rebuffering_events keeps track of the total number of instances during playback of the video content that rebuffering occurs. In addition, the current video segment number is set to one (k=1), the selected bit-rate level for the first video segment is set to the lowest bit-rate level available ($R_1=r_1$), and the fill level of the playback buffer is initialized to zero ($B_1=0$). With these values in place, the HTTP engine issues a request for video segment 1 encoded at bit-rate level $r_1$ and the fill level is updated to $B_2=B_1+L$. After the initialization of the parameters outlined above, playback by the decoder is started.

After the process has been started, the occupancy level of the playback buffer is checked to determine if there is room in the playback buffer to append video segment k (block 402). If there is not sufficient space in the playback buffer for video segment k, the occupancy level of the playback buffer is reduced using Playback $((B_k+1+L-B_{max})_+)$, where Playback (t) is a function that consumes video content of length t in the playback buffer and $(x)_+=\max(x, 0)$ ensures that the term can never be negative (block 404). The fill level of the playback buffer is then updated to $B_{k+1}=B_{k+1}-(B_{k+1}+L-B_{max})_+$.

$\Delta t_k$ represents a waiting time before the HTTP engine may start to download chunk k+1 after the downloading of chunk k has been completed. $\Delta t_k$ is employed in some ABR control algorithms to improve fairness of multi-player video streaming. If $\Delta t_k$ is being employed, the fill level of the playback buffer is reduced using Playback $(\Delta t_k)$ and the fill level is updated to $B_{k+1}=B_{k+1}-\Delta t_k$ (block 406).

A bit-rate level for a next video segment ($R_{k+1}$) is determined by the ABR controller (block 408). For example, the bit-rate level for the next video segment may be determined using the function $R_{k+1}=f(\hat{C}_{k+1}, B_{k+1})$ where $R_{k+1} \in \Re$, $\hat{C}_{k+1}$ is the predicted bandwidth for downloading the next video segment, and $B_{k+1}$ is the fill level of the playback buffer at the start of downloading the video segment k+1. The predicted throughput or bandwidth may rely on the previous measures of network bandwidth. For example, $C=\{C_{k-N+1}, C_{K-N+2}, \ldots, C_{k-1}, C_k\}$ may represent the measured network bandwidth experienced during the download of the last N video segments and $\tilde{C}=\{\tilde{C}_{K-N+1}, \tilde{C}_{K-N+2}, \ldots, \tilde{C}_{k-1}, \tilde{C}_k\}$ may represent the estimated network bandwidths determined for last N video segments. The predicted bandwidth $\hat{C}_{k+1}$ for downloading the next video segment, i.e. video segment k+1, is a function of C and $\tilde{C}$, i.e. $\hat{C}_{k+1}=g(C, \tilde{C})$. For example, the predicted bandwidth $\hat{C}_{k+1}$ may be determined by taking the harmonic average of the previously measured bandwidths as laid out in the equations below.

$$\hat{C}_{k+1} = 1 \Big/ \sum\nolimits_{l=1}^{N} \frac{1}{C_{k-l+1}}$$

$$\text{max\_err} = \max_{k-N+1 \le l \le k} \frac{|C_l - \hat{C}_l|}{C_l}$$

$$\hat{C}_{k+1} = \frac{\hat{C}_{k+1}}{1 + \text{max\_err}}$$

The subject technology is not limited to algorithms that use both the predicted bandwidth and the fill level. For example, some algorithms may use only the predicted bandwidth to select and set a bit-rate level for the next video segment. Alternatively, other algorithms may use only the fill levels to select and set a bit-rate level for the next video segment.

With the bit-rate level set for the next video segment, k is incremented (k=k+1) (block 410) and the HTTP engine issues a request to the server for the next video segment (block 412).

The ABR controller may periodically monitor the network bandwidth experienced during the downloading of the video segment and may make a decision to abandon the downloading of the video segment at the current bit-rate level and restart the downloading of the video segment at a new lower bit-rate level if certain conditions are met (block 414). The conditions may include if the elapsed downloading time at the current bit-rate level satisfies a first pre-defined threshold, if the remaining downloading time at the current bit-rate level satisfies another pre-defined threshold, if the bit-rate level estimated based on the network bandwidth experienced so far during the downloading of the video segment is less than the current bit-rate level set for the video segment, and/or an estimated size of the video segment at a lower bit-rate level is smaller than the size of the video segment at the current bit-rate level remaining to be downloaded. The subject technology is not limited to these conditions for the evaluation of whether to abandon the downloading of a video segment and start downloading the video segment at a lower bit-rate level.

If the download of the video segment at the current bit-rate level is abandoned (block 414), an amount of rebuffering time and a number of rebuffering events are determined for the period of time before the downloading was abandoned and the occupancy level of the playback buffer is updated to reflect the amount of video content in the playback buffer that was consumed by the decoder (block 416). These updates may be made based on the following equations:

$$\text{Playback}\left(\frac{sd_k(R_k)}{SC_k}\right)$$

$$\text{tr\_time} += \left(B_k - \frac{sd_k(R_k)}{SC_k}\right)_+$$

$$\text{tr\_events} += \left(\frac{sd_k(R_k)}{SC_k} > B_k\right)_1$$

$$B_k = \left(B_k - \frac{sd_k(R_k)}{SC_k}\right)_+$$

where $sd_k(R_k)$ is the size of the portion of the video segment that was downloaded at the current bit-rate level before the download was abandoned, $SC_k$ is the average network bandwidth (throughput) experienced during the download of the video segment at the current bit-rate level before the download was abandoned, and $$(x)_1 = \begin{cases} 1 & \text{if } x > 0 \\ 0 & \text{if } x \le 0 \end{cases}.$$

With the download of the video segment at the current bit-rate level $R_k$ abandoned, a new bit-rate level $\hat{R}_k$ is determined and $R_k$ is set to $\hat{R}_k$ for the video segment (block 418). For example, the new bit-rate level $\hat{R}_k$ (with $\hat{R}_k < R_k$) may be a function of the downloaded video segment size so far $sd_k(R_k)$, the current video segment size $d_k(R_k)$, the network bandwidth experienced so far $SC_k$, and the current bit-rate level $R_k$, namely:

$$\hat{R}_k = h(sd_k(R_k), d_k(R_k), SC_k, R_k)$$

The subject technology is not limited to any particular function for determining the new bit-rate level $\hat{R}_k$. In addition, the function may be based on fewer factors or more factors than those outlined above. With the new bit-rate level set for the video segment k, the process returns to the HTTP engine issuing a request to the server for the video segment encoded at the new bit-rate level (block 412).

If the download of video segment k is allowed to complete rather than be abandoned (block 414), an amount of rebuffering time and a number of rebuffering events are determined for the period of time the downloading occurred and the occupancy level of the playback buffer is updated to reflect the amount of video content in the playback buffer that was consumed by the decoder during that period of time (block 420). These updates may be made based on the following equations:

$$\text{Playback}\left(\frac{d_k(R_k)}{C_k}\right)_+$$

$$\text{tr\_time} += \left(B_k - \frac{d_k(R_k)}{C_k}\right)_+$$

$$\text{tr\_events} += \left(\frac{d_k(R_k)}{C_k} > B_k\right)_1$$

$$B_{k+1} = \left(\left(B_k - \frac{d_k(R_k)}{C_k}\right)_+ + L\right)_+$$

where $d_k(R_k)$ be the size of the video segment k encoded at bit-rate level $R_k$ and $C_k$ is the average network bandwidth (throughput) experienced during downloading the video segment k.

The process continues by determining whether any video segments of the video content remain to be downloaded from the server (k<K) (block 422). If video segments remain on the server to be downloaded, the process returns to check the occupancy level of the playback buffer to determine if there is room in the playback buffer to append video segment k (block 402). If all K video segments of the video content V have been downloaded from the server, the video segments remaining in the playback buffer are decoded by the decoder for playback and the playback of the video content ends.

Figure 5:
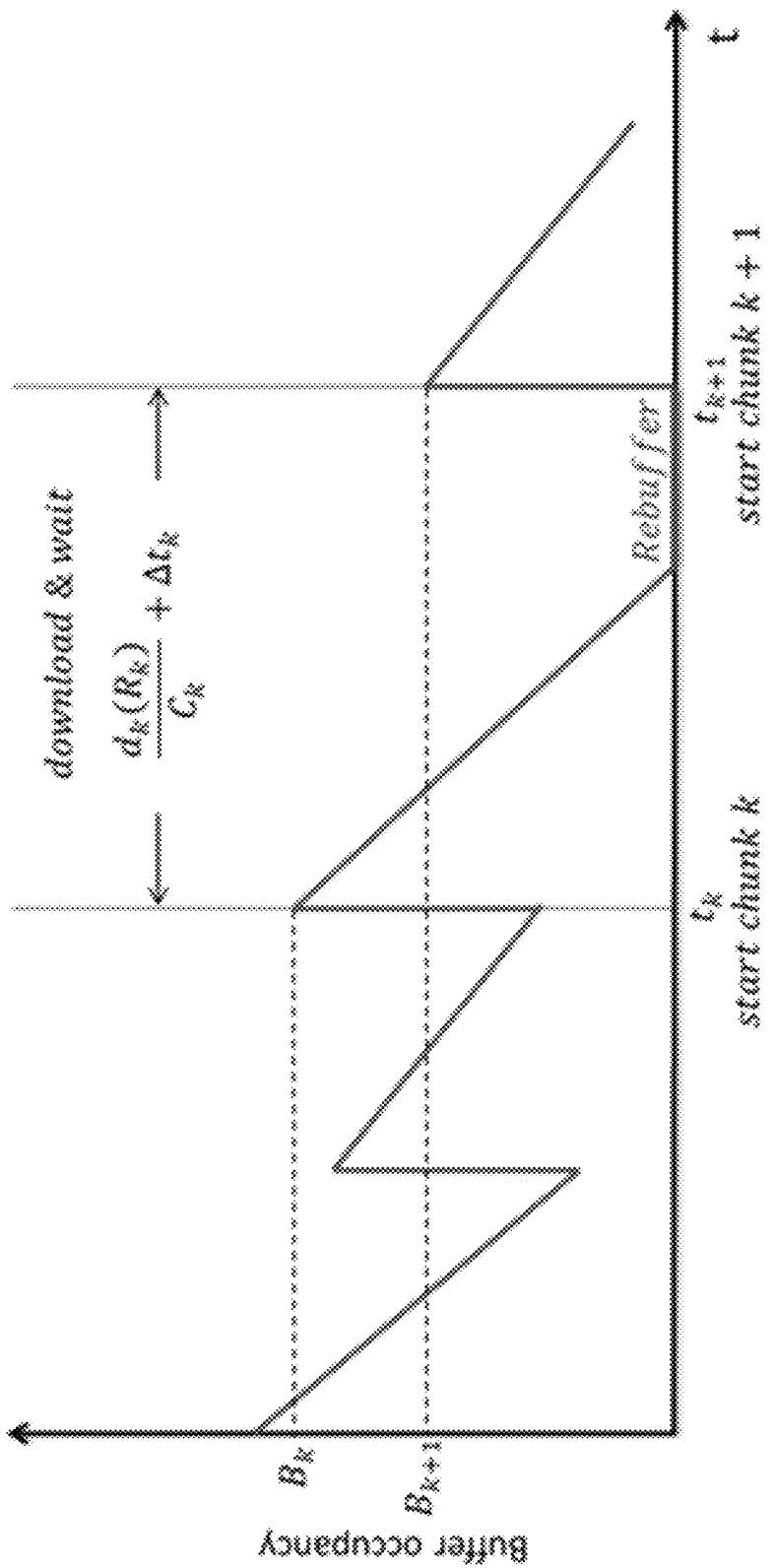
FIG. 5 is a graph illustrating an occurrent of rebuffering during operation of an adaptive video player according to aspects of the subject technology.

As noted above, rebuffering is an important factor in evaluating the QoE in Internet video applications. FIG. 5 is a graph illustrating an occurrence of rebuffering during operation of an adaptive video player according to aspects of the subject technology. At time $t_k$, the adaptive video player starts to download chunk (video segment) k. The download time for this chunk will be $d_k(R_k)/C_k$, i.e., it depends on the size of selected chunk with bit-rate $R_k$, as well as average download bandwidth (throughput) $C_k$. Once chunk k is completely downloaded, the video player waits for $\Delta t_k$ and starts to download the next chunk k+1 at time $t_{k+1}$. The fill level B (t) evolves as the chunks are being downloaded and the video is being played. Specifically, the fill level increases by L seconds after chunk k is downloaded and decreases by $d_k(R_k)/C_k$ seconds as the player consumes chunks from the playback buffer. The buffer dynamics can be formulated as follows:

$$t_{k+1} = t_k + \frac{d_k(R_k)}{C_k} + \Delta t_k$$

$$B_{k+1} = \left(\left(B_k - \frac{d_k(R_k)}{C_k}\right)_+ + L - \Delta t_k\right)_+$$

As illustrated in FIG. 5, if $$B_k < \frac{d_k(R_k)}{C_k},$$

the playback buffer becomes empty while the adaptive video player is still downloading chunk k, leading to a rebuffering event. The total amount of rebuffering time experienced during the playback of video content V may be defined as:

$$\text{tr\_time} = \sum_{k=1}^{K}\left(B_k - \frac{d_k(R_k)}{C_k}\right)_+$$

Similarly, the total number of rebuffering events experienced during the playback of video content V may be defined as:

$$\text{tr\_events} = \sum_{k=1}^{K}\left(\frac{d_k(R_k)}{C_k} > B_k\right)_1$$

One example of a QoE metric that may be used to evaluate the performance of an adaptive video system considers the user experience with both the average video quality over all downloaded chunks and the penalty caused by the average quality variations from one chunk to another, the rebuffering time and the startup delay. The QoE metric is defined as:

$$QoE_1^K = \frac{1}{K}\sum_{k=1}^{K}q(R_k) - \frac{\alpha}{K-1}\sum_{k=1}^{K-1}|q(R_{k+1}) - q(R_k)| -$$

$$\beta\sum_{k=1}^{K}\left(B_k - \frac{d_k(R_k)}{C_k}\right)_+ - \gamma T_s$$

where q (.) is a nondecreasing function which maps selected bit-rate level $R_k$ to video quality q ($R_k$) perceived by user, and where $\alpha$, $\beta$, $\gamma$ are non-negative weighting parameters corresponding to video quality variations, rebuffering time and startup delay, respectively.

By assuming the quality mapping function $q(R_k)=R_k$ and setting $\alpha=1$, $$\beta = \frac{r_M}{K * L}$$

and $\gamma=0$, the QoE metric can be simplified as the effective bit-rate (i.e., the average playback bit-rate minus the penalty of rebuffering time and streaming video quality variations). The effective bit-rate for streaming K chunks may then be defined as:

$$\text{Effective\_bitrate}_1^K =$$

$$\frac{1}{K}\sum_{k=1}^{K}R_k - \frac{1}{K-1}\sum_{k=1}^{K-1}|R_{k+1} - R_k| - \frac{r_M}{K*L}\sum_{k=1}^{K}\left(B_k - \frac{d_k(R_k)}{C_k}\right)_+$$

Here the initial startup delay is not included in the effective bit-rate metric as it is often a fixed amount of time, irrespective of which ABR control algorithm is used.

Figure 6:
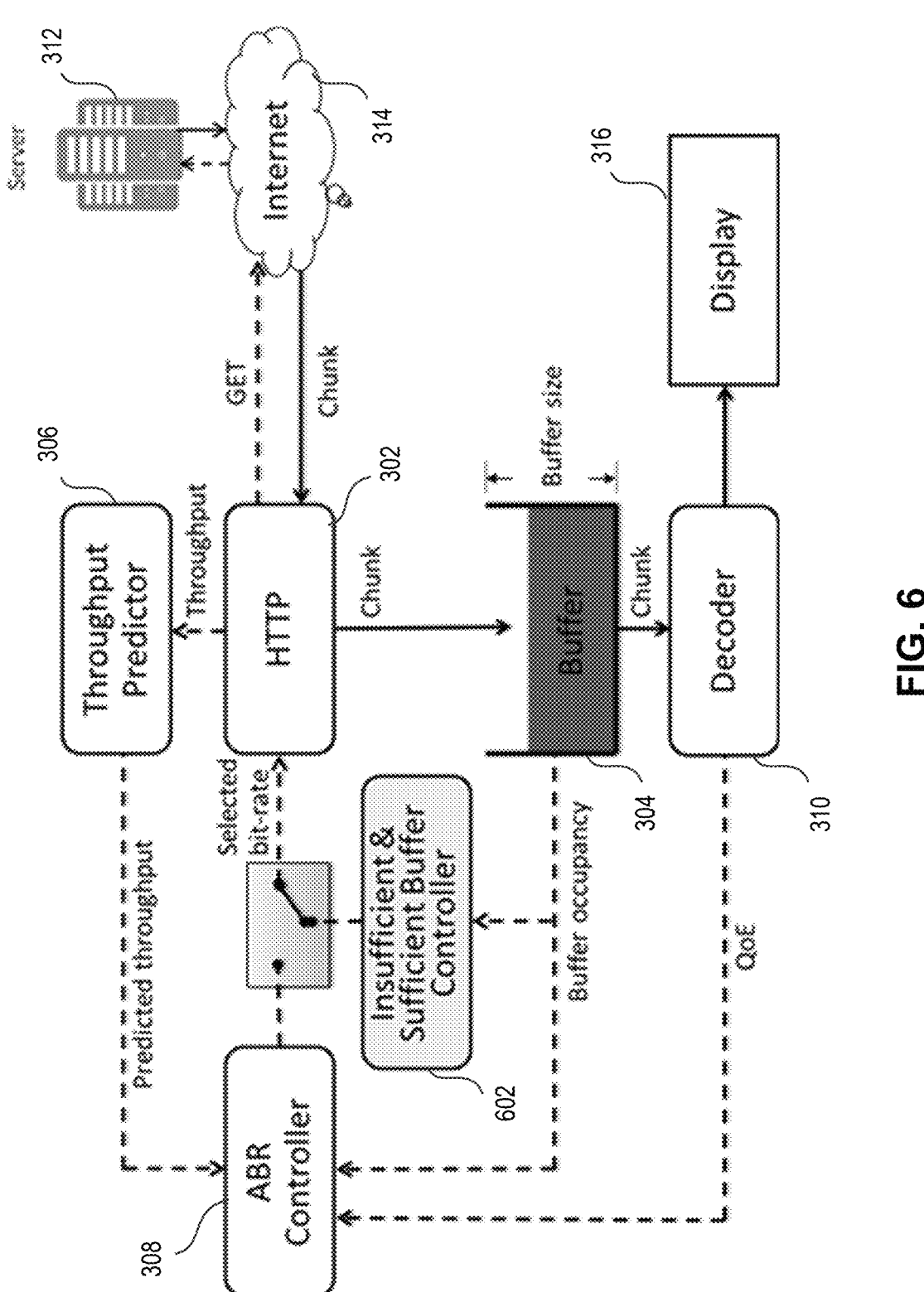
FIG. 6 is a block diagram illustrating components of an electronic device according to aspects of the subject technology.

FIG. 6 is a block diagram illustrating components of an electronic device according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

The electronic device depicted in FIG. 6 is similar to the electronic device described above in connection with FIG. 3. For example, both electronic devices include HTTP engine 302, playback buffer 304, throughput predictor 306, ABR controller 308, and decoder 310, the description of which will not be repeated. However, the electronic device depicted in FIG. 6 has been modified to include insufficient and sufficient buffer controller 602 that applies a control algorithm on top of the control algorithm applied by ABR controller 308 to set the bit-rate levels for the video segments requested and downloaded from server 312 via network 314. The new control algorithm applied by insufficient and sufficient buffer controller 602 reduces rebuffering time and events and improves QoE using the fill level of playback buffer 304 to identify conditions to replace the bit-rate level set by ABR controller 308 with more appropriate bit-rate levels for the corresponding fill level. The process performed by insufficient and sufficient buffer controller 602 is described in more detail below in connection with FIG. 7.

Each of the components depicted in FIG. 6, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or may be implemented as a combination of both.

Figure 7:
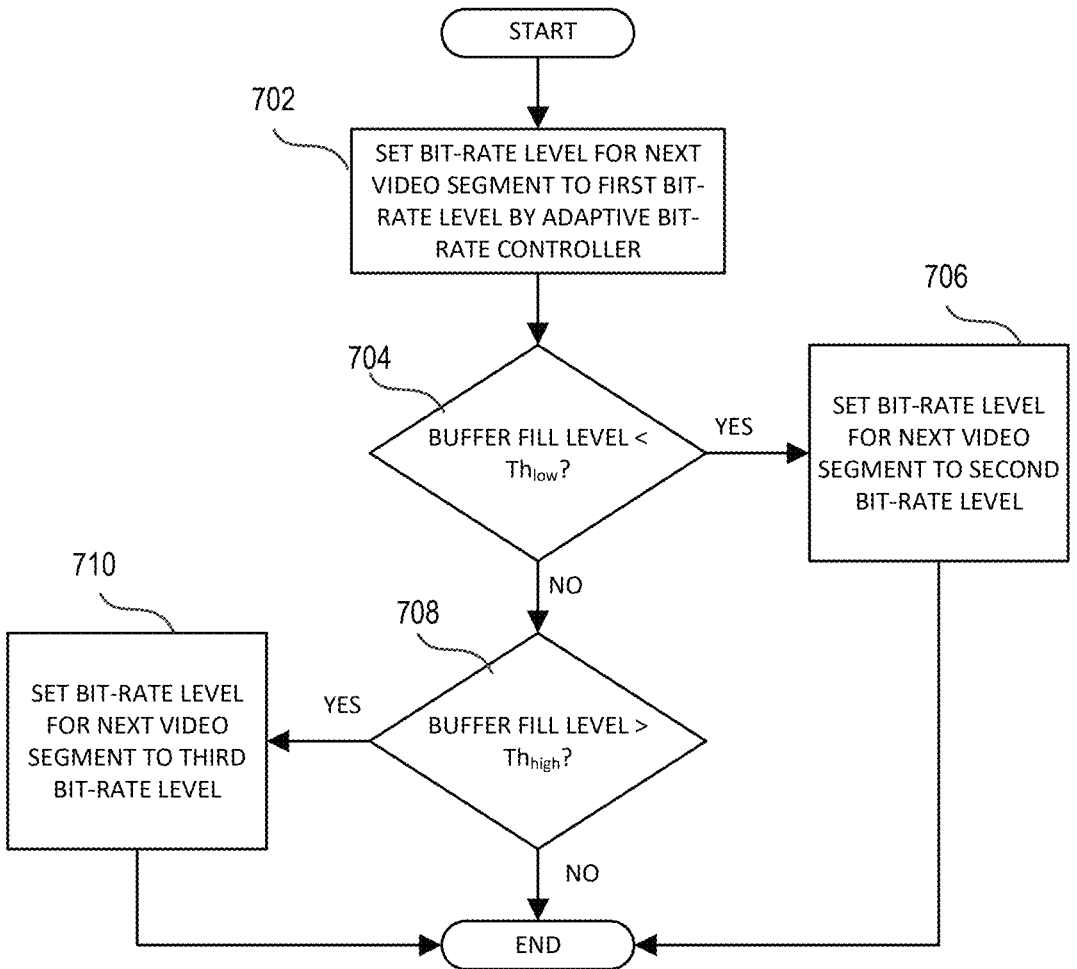
FIG. 7 is a flowchart illustrating an example process for setting a bit-rate level for a video segment according to aspects of the subject technology.

FIG. 7 is a flowchart illustrating an example process for setting a bit-rate level for a video segment according to aspects of the subject technology. For explanatory purposes, the blocks of the process illustrated in FIG. 7 are described herein as occurring in serial, or linearly. However, multiple blocks of the process may occur in parallel. In addition, the blocks of the process need not be performed in the order shown and/or one or more blocks of the process need not be performed and/or can be replaced by other operations.

The process illustrated in FIG. 7 replaces or supplements the operations described above in connection with block 408 of FIG. 4. In the process of FIG. 7, the ABR controller determines and sets a bit-rate level for the next video segment to be downloaded by the HTTP engine in the manner described above with respect to block 408 in FIG. 4 (block 702). In particular, the bit-rate level for the next video segment may be determined using the function $R_{k+1}=f(\hat{C}_{k+1}, B_{k+1})$ where $R_{k+1} \in \Re$, $\hat{C}_{k+1}$ is the predicted bandwidth for downloading the next video segment, and $B_{k+1}$ is the fill level of the playback buffer at the start of downloading the video segment k+1.

The fill level $B_{k+1}$ is compared against a first threshold, $Th_{low}$, representing a relatively low fill level for the playback buffer. If the fill level $B_{k+1}$ is less than the first threshold $Th_{low}$ (block 704), the first bit-rate level for the next video segment set by the ABR controller is replaced with a second bit-rate level that is predetermined (block 706). For example, the ABR controller may write the set first bit-rate level in a control register that is accessible to the HTTP engine. When the fill level satisfies the first threshold, the second bit-rate level may replace the first bit-rate level in the control register. The predetermined second bit-rate level is a relatively low bit-rate level that will allow the next video segment to be downloaded more quickly into the playback buffer and hopefully avoid a rebuffering event. For example, the predetermined second bit-rate level may be the lowest bit-rate level from $\Re =\{r_1, r_2, \ldots, r_M\}$ which results in $R_{k+1}=r_1$.

If the fill level $B_{k+1}$ is not less than the first threshold $Th_{low}$ (block 704), the fill level $B_{k+1}$ is compared against a second threshold, $Th_{high}$, representing a relatively high fill level for the playback buffer. If the fill level $B_{k+1}$ is greater than the second threshold $Th_{high}$ (block 708), the first bit-rate level for the next video segment set by the ABR controller is replaced with a third bit-rate level that is predetermined (block 710). The predetermined third bit-rate level is a relatively high bit-rate level that will take advantage of a cushion of playback time provided by the relatively high fill level to increase the bit-rate level for the next video segment and thereby increase the quality of the next video segment during playback. For example, the predetermined third bit-rate level may be the highest bit-rate level from $\Re = \{r_1, r_2, \ldots, r_M\}$ which results in $R_{k+1}=r_M$.

If the fill level $B_{k+1}$ does not satisfy the second threshold (block 708), the bit rate level for the next video segment set by the ABR controller is left in place. In summary, the insufficient and sufficient buffer controller modifies the adaptive video player such that the bit-rate level set for the next video segment $R_{k+1}$ is set according to the following criteria:

$$R_{k+1} = \begin{cases} r_1 & \text{if } B_{k+1} < Th_{low} \\ r_M & \text{if } B_{k+1} > Th_{high} \\ f(\hat{C}_{k+1}, B_{k+1}) & \text{Otherwise} \end{cases}$$

The first and second thresholds, $Th_{low}$ and $Th_{high}$, may be configurable. According to aspects of the subject technology, the two thresholds may be set as follows:

$$Th_{low} = \frac{4*L}{3}$$

$$Th_{high} = B_{max} - \frac{4*L}{3}$$

12

Figure 8:
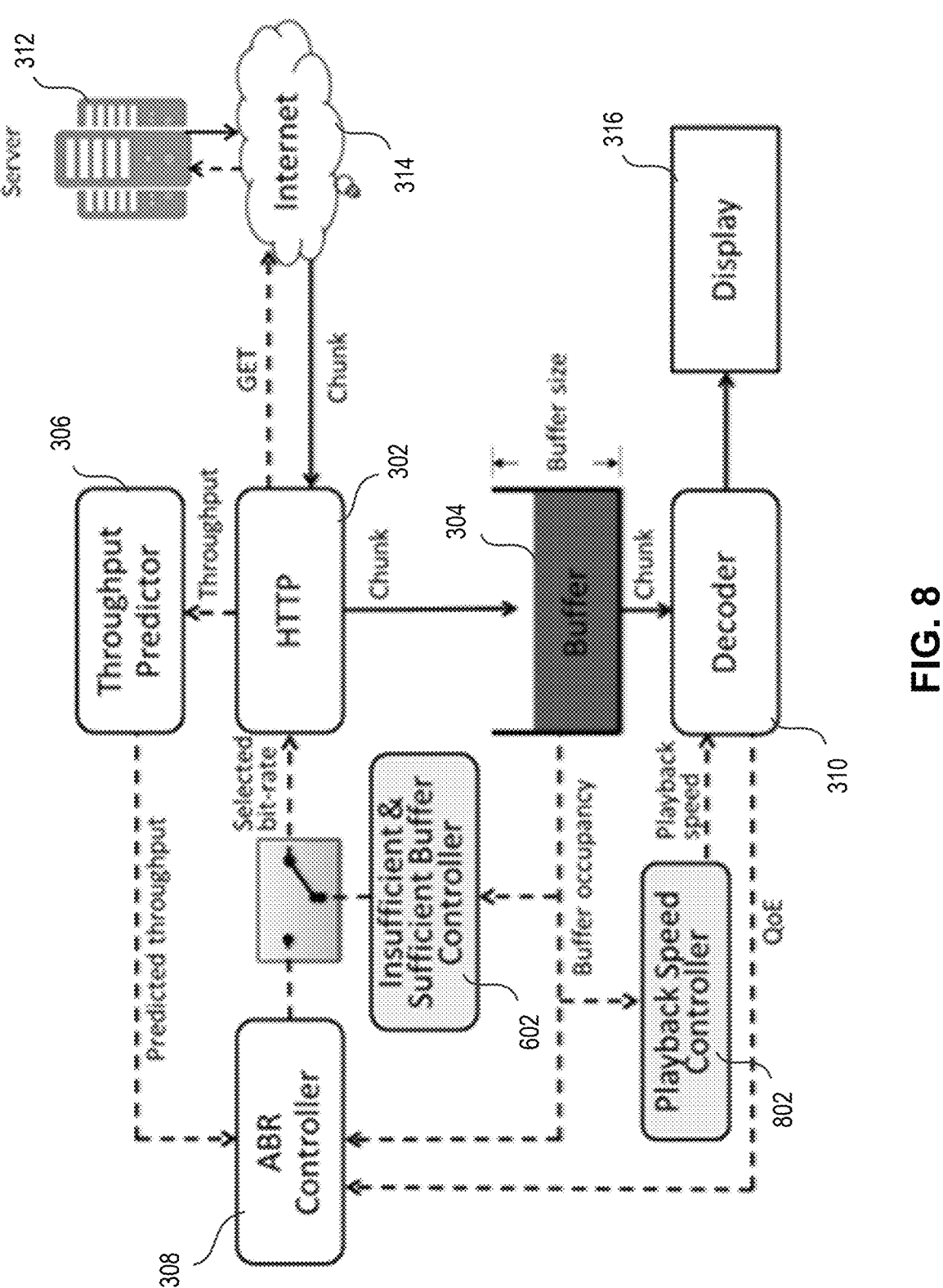
FIG. 8 is a block diagram illustrating components of an electronic device according to aspects of the subject technology.

FIG. 8 is a block diagram illustrating components of an electronic device according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

The electronic device depicted in FIG. 8 is similar to the electronic devices described above in connection with FIGS. 3 & 6. For example, all three electronic devices include HTTP engine 302, playback buffer 304, throughput predictor 306, ABR controller 308, and decoder 310, the description of which will not be repeated. In addition, the electronic device depicted in FIG. 8 includes insufficient and sufficient buffer controller 602, the description of which also will not be repeated. However, the electronic device depicted in FIG. 8 has been modified to include playback speed controller 802. It is noted that the incorporation of insufficient and sufficient buffer controller 602 in the electronic device of FIG. 8 is optional and playback speed controller 802 may be incorporated into the electronic device with or without insufficient and sufficient buffer controller 602.

According to aspects of the subject technology, playback speed controller 802 implements a control algorithm that adjusts a playback speed for a video segment based on a fill level of the playback buffer. The control algorithm leverages a property of the human visual system where changes in playback speed of video content within about 10% of the real-time playback speed (above or below) are generally not noticeable to the viewer. For example, if the fill level is less than a pre-defined low threshold, i.e., $Th_{low}$, or if the fill level is less than a pre-defined middle threshold, i.e., $Th_{mid}$, and the previous video segment downloading was abandoned, the decoder is set to a slow-playback mode (e.g., 90% of real-time playback speed) for the video segment. Slowing the playback speed of the decoder for a video segment provides more time to download the next video segment into the playback buffer before playback of the current video segment completes and therefore reduces the chance of a rebuffering event or potentially shortens the duration of a rebuffering event. If the fill level is higher than a pre-defined high threshold, i.e., $Th_{high}$, and the playback lags behind the real-time playback speed due to slow playback mode being previously used, the decoder is switched to a fast-playback mode (e.g., 110% of real-time playback speed) for the video segment to catch up playback speed. Otherwise, the decoder is set to normal real time playback mode. The operation of playback speed controller 802 is described in further detail below in connection with FIGS. 9 & 10.

Each of the components depicted in FIG. 8, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or may be implemented as a combination of both.

Figure 9:
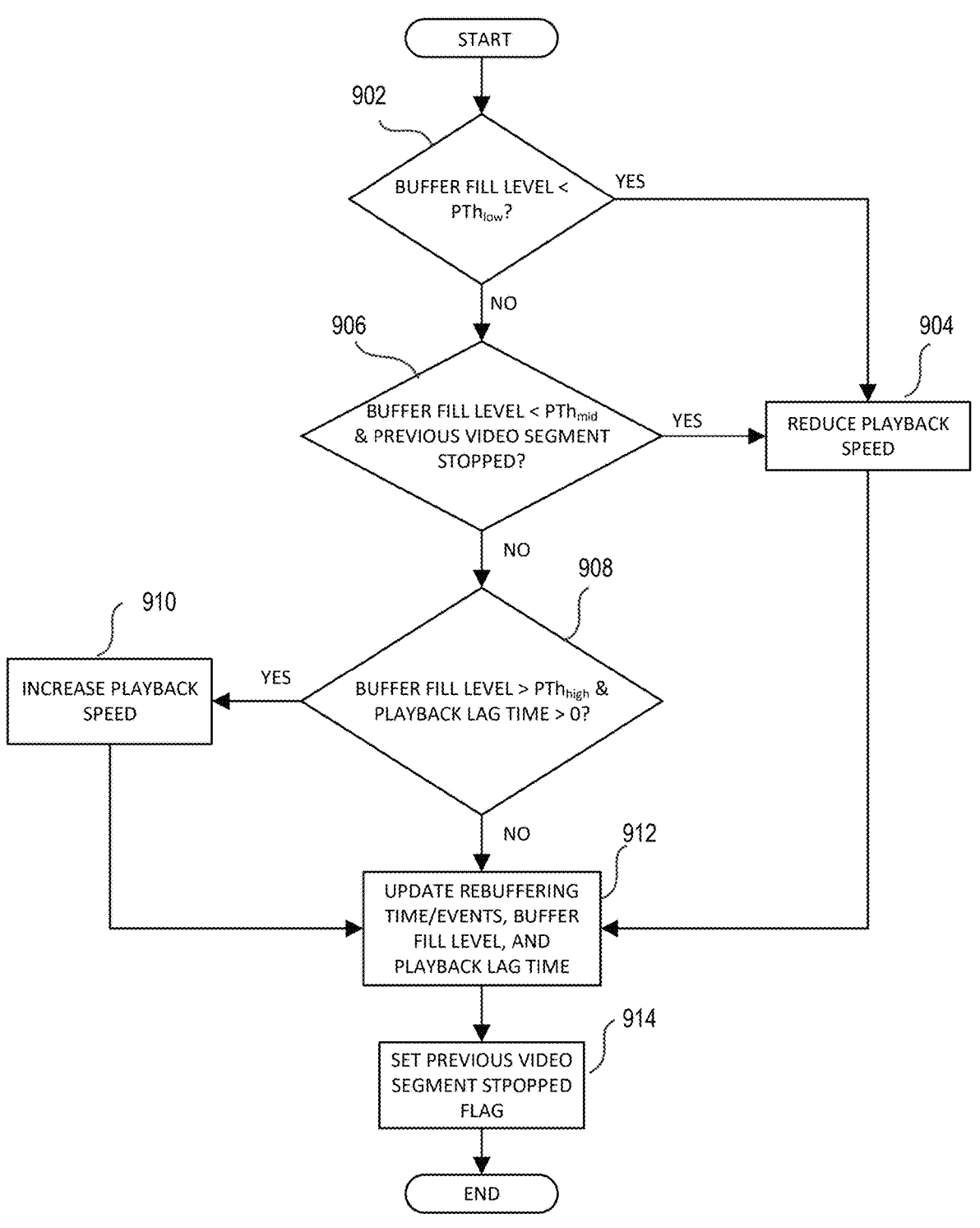
FIG. 9 is a flowchart illustrating an example process using playback speed control for a video segment according to aspects of the subject technology.

FIG. 9 is a flowchart illustrating an example process using playback speed control for a video segment according to aspects of the subject technology. For explanatory purposes, the blocks of the process illustrated in FIG. 9 are described herein as occurring in serial, or linearly. However, multiple blocks of the process may occur in parallel. In addition, the blocks of the process need not be performed in the order shown and/or one or more blocks of the process need not be performed and/or can be replaced by other operations.

The process illustrated in FIG. 9 replaces or supplements the process described above for block 416 of FIG. 4. As discussed above, this stage of the process follows a decision to abandon the downloading of a video segment in order to start over using a lower bit-rate level for the video segment. Initially, the fill level of the playback buffer is compared against the threshold $PTh_{low}$ (block 902). If the fill level is less than $PTh_{low}$, playback speed controller 802 changes the playback speed set for the video segment by reducing the playback speed by a specified amount (e.g., 10%, 5%, 3%, etc.) changing the playback speed from a first playback speed to a second playback speed (block 904).

If the fill level of the playback buffer does not satisfy the threshold $PTh_{low}$, the fill level of the playback buffer is compared against the threshold $PTh_{mid}$, which is greater than $PTh_{low}$ (block 906). In addition, the process determines whether downloading of the previous video segment was abandoned and restarted at a lower bit-rate level (block 906). This determination may be made by checking whether a flag in a specified memory location has been set. If the fill level is determined to be less than the threshold $PTh_{mid}$ and downloading of the previous video segment was abandoned, playback speed controller 802 changes the playback speed for the video segment by reducing the playback speed by a specified amount (e.g., 10%, 5%, 3%, etc.) changing the first playback speed to the second playback speed (block 904). The amount by which the playback speed is reduced may be the same as for the condition where the fill level satisfies the threshold $PTh_{low}$, or it may be reduced by a different amount.

If the fill level of the playback buffer does not satisfy the threshold $PTh_{mid}$, the fill level of the playback buffer is compared against the threshold $PTh_{high}$, which is greater than $PTh_{mid}$ (block 908). In addition, the process makes a determination on whether an amount of playback lag time is greater than zero (block 908). The playback lag time tracks the amount of time playback of the current video content lags behind the real-time playback of the video content due to the playback speed for one or more previous video segments being reduced. If the fill level is greater than the threshold $PTh_{high}$ and the current amount of playback lag time is greater than zero, playback speed controller 802 changes the playback speed for the video segment by increasing the playback speed by a specified amount (e.g., 10%, 5%, 3%, etc.) changing the playback speed from the first playback speed to a third playback speed (block 910). If the fill level of the playback buffer is not greater than $PTh_{high}$, or there is no playback lag time, no change is made to the playback speed of the video segment.

After reducing the playback speed for the video segment (block 904), increasing the playback speed for the video segment (block 910), or if no change is made to the playback speed the process proceeds to updating the amount of rebuffering time, the number of rebuffering events, the fill level, and the amount of playback lag time for the period during which video segment k started downloading until abandonment (block 912). The manner in which these parameters are updated varies depending on whether the playback speed for the video segment was reduced, increased, or left unchanged.

If the playback speed for the video segment was reduced, the following equations are used to update the parameters:

$$\text{Playback}\left((1-\delta)\frac{sd_k(R_k)}{SC_k}\right)$$

$$\text{tr\_time} \mathrel{+}= \left(B_k - (1-\delta)\frac{sd_k(R_k)}{SC_k}\right)_+$$

$$\text{tr\_events} \mathrel{+}= \left((1-\delta)\frac{sd_k(R_k)}{SC_k} > B_k\right)_1$$

$$B_k = \left(B_k - (1-\delta)\frac{sd_k(R_k)}{SC_k}\right)_+$$

$$\text{pt\_lag} \mathrel{+}= \delta * \frac{sd_k(R_k)}{SC_k}$$

where $\delta$ is the fractional amount by which the playback speed is changed (e.g., 0.1, 0.05, 0.03, etc.) and pt_lag is the amount of playback lag time accumulated during playback of the video content. The playback lag time is initialized to zero at the start of playing back video content, such as the beginning of the process represented in FIG. 4. $\delta$ may be a configurable value. If the playback speed for the video segment was increased and the playback lag time was greater than zero, the following equations are used to update the parameters:

$$\text{Playback}\left((1+\delta)\frac{sd_k(R_k)}{SC_k}\right)$$

$$\text{tr\_time} \mathrel{+}= \left(B_k - (1+\delta)\frac{sd_k(R_k)}{SC_k}\right)_+$$

$$\text{tr\_events} \mathrel{+}= \left((1+\delta)\frac{sd_k(R_k)}{SC_k} > B_k\right)_1$$

$$B_k = \left(B_k - (1+\delta)\frac{sd_k(R_k)}{SC_k}\right)_+$$

$$pt_{lag} \mathrel{+}= -\delta * \frac{sd_k(R_k)}{SC_k}$$

If no changes were made the playback speed for the video segment, the parameters are updated in the manner described above with respect to block 416 in FIG. 4. The process then sets the previous video segment abandoned flag to true to reflect the abandonment of downloading the video segment (block 914).

Figure 10:
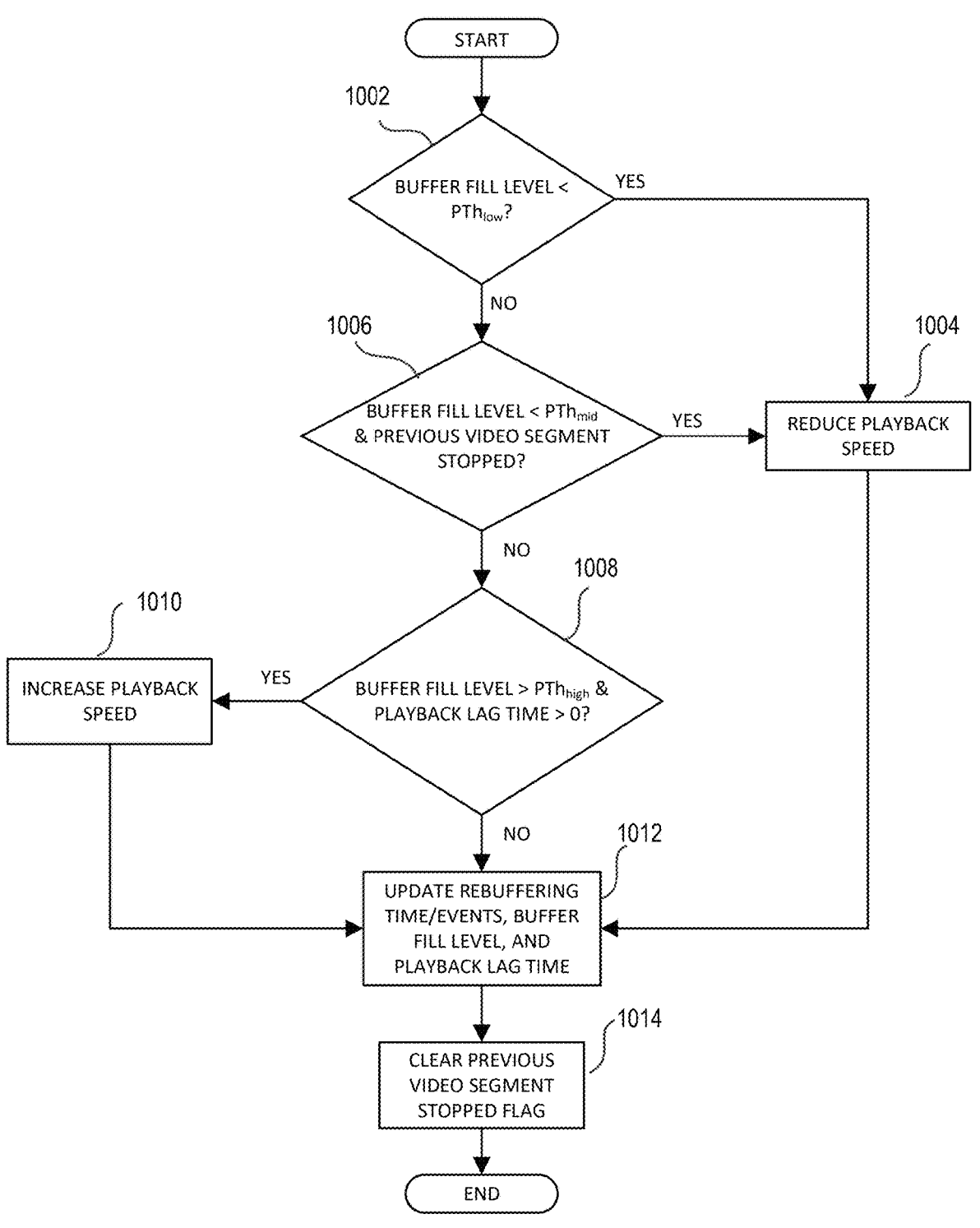
FIG. 10 is a flowchart illustrating an example process using playback speed control for a video segment according to aspects of the subject technology.

FIG. 10 is a flowchart illustrating an example process using playback speed control for a video segment according to aspects of the subject technology. For explanatory purposes, the blocks of the process illustrated in FIG. 10 are described herein as occurring in serial, or linearly. However, multiple blocks of the process may occur in parallel. In addition, the blocks of the process need not be performed in the order shown and/or one or more blocks of the process need not be performed and/or can be replaced by other operations.

The process illustrated in FIG. 10 replaces or supplements the process described above for block 420 of FIG. 4. As discussed above, this stage of the process follows a decision not to abandon downloading of the video segment k. The portion of the process that adjusts the playback speed for the video segment k based on the fill level of the playback buffer (blocks 1002, 1004, 1006, 1008, and 1010) follows the same corresponding portion of the process described above with respect to FIG. 9 (blocks 902, 904, 906, 908, and 910) and the description of this portion of the process will not be repeated.

After reducing the playback speed for the video segment (block 1004), increasing the playback speed for the video segment (block 1010), or if no change is made to the playback speed the process proceeds to updating the amount of rebuffering time, the number of rebuffering events, the fill level, and the amount of playback lag time after video segment k has completed downloading (block 1012). Similar to what was discussed above with respect to FIG. 9, the manner in which these parameters are updated varies depending on whether the playback speed for the video segment was reduced, increased, or left unchanged.

If the playback speed for the video segment was reduced, the following equations are used to update the parameters:

$$\text{Playback}\left((1-\delta)\frac{d_k(R_k)}{C_k}\right)$$

$$\text{tr\_time} \mathrel{+}= \left(B_k - (1-\delta)\frac{d_k(R_k)}{C_k}\right)_+$$

$$\text{tr\_events} \mathrel{+}= \left((1-\delta)\frac{d_k(R_k)}{C_k} > B_k\right)_1$$

$$B_{k+1} = \left(\left(B_k - (1-\delta)\frac{d_k(R_k)}{C_k}\right)_+ + L\right)_+$$

$$\text{pt\_lag} \mathrel{+}= \delta * \frac{d_k(R_k)}{C_k}$$

If the playback speed for the video segment was increased and the playback lag time was greater than zero, the following equations are used to update the parameters:

$$\text{Playback}\left((1+\delta)\frac{d_k(R_k)}{C_k}\right)$$

$$\text{tr\_time} \mathrel{+}= \left(B_k - (1+\delta)\frac{d_k(R_k)}{C_k}\right)_+$$

$$\text{tr\_events} \mathrel{+}= \left((1+\delta)\frac{d_k(R_k)}{C_k} > B_k\right)_1$$

$$B_{k+1} = \left(\left(B_k - (1+\delta)\frac{d_k(R_k)}{C_k}\right)_+ + L\right)_+$$

$$\text{pt\_lag} \mathrel{+}= -\delta * \frac{d_k(R_k)}{C_k}$$

If no changes were made the playback speed for the video segment, the parameters are updated in the manner described above with respect to block 420 in FIG. 4. The process then sets the previous video segment abandoned flag to false to reflect the completion of downloading video segment k (block 1014).

The thresholds $PTh_{low}$, $PTh_{mid}$, and $PTh_{high}$ may be configurable. For example, these thresholds may be set at follows:

$$PTh_{low} = \frac{4*L}{3}$$

$$PTh_{mid} = \frac{8*L}{3}$$

$$PTh_{high} = B_{max} - \frac{4*L}{3}$$

While the values for $PTh_{low}$ and $PTh_{high}$ indicated above are the same as the values for $Th_{low}$ and $Th_{high}$ used for the implementations described above in connection with FIG. 7, the subject technology is not limited to using the same threshold values for these different control algorithms and may implement the different control algorithms with different threshold values.

Changing the playback speeds used by the decoder in decoding video segments from the playback buffer may rely on trick modes to either reduce the playback speed or increase the playback speed while matching the target display frame-rate. For example, frame-rate conversion (FRC) may be turned on in the decoder when the playback speed is reduced to insert additional frames between the existing frames in the video segment. Similarly, the decoder may periodically drop one or more existing frames from the video segment during playback when the playback speed is increased. In addition, audio/speech pitch correction may be applied to audio portions of the video segment to match the expected sound pitch experienced during unchanged playback speeds.

Figure 11:
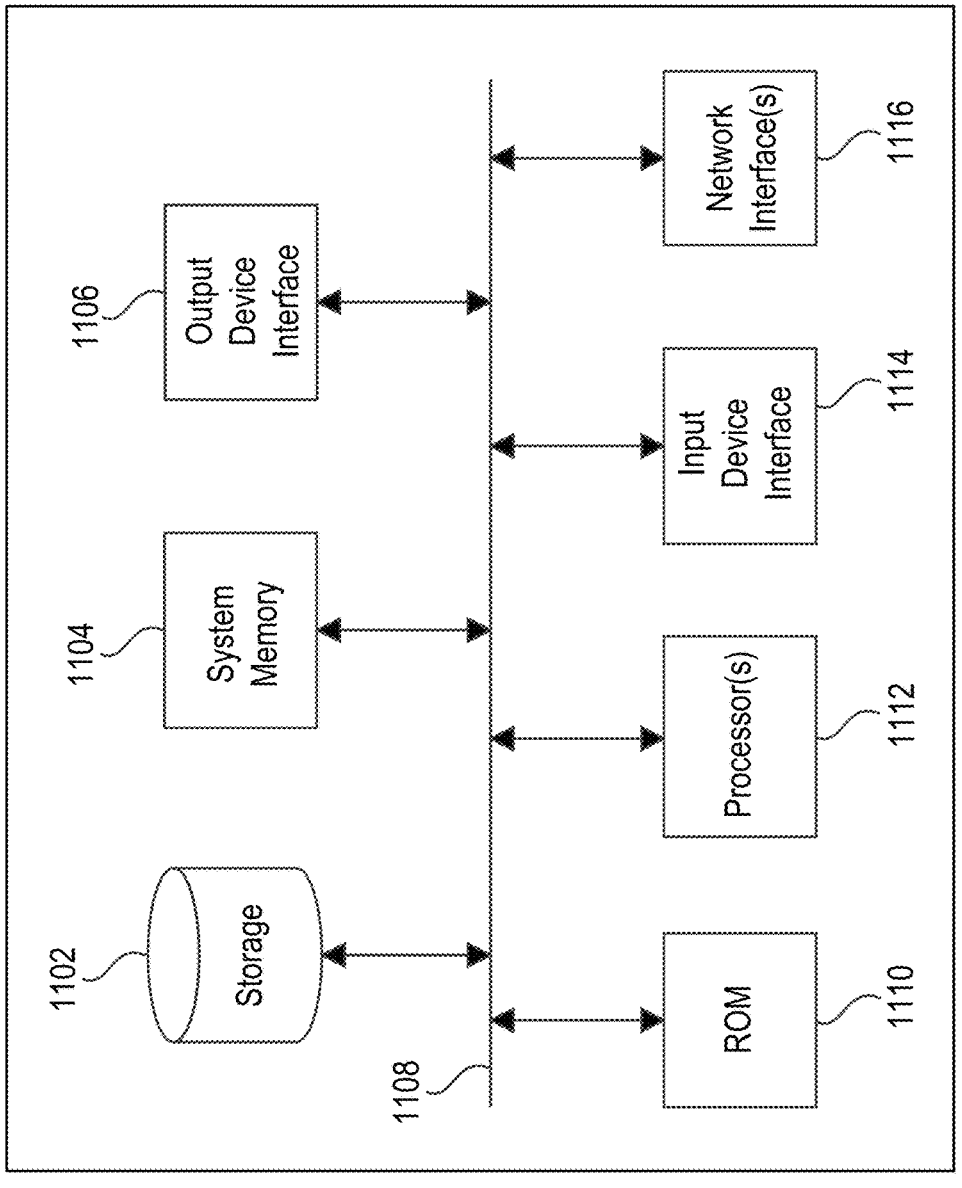
FIG. 11 is a block diagram that illustrates an electronic system with which aspects of the subject technology may be implemented.

FIG. 11 conceptually illustrates an electronic system 1100 with which one or more implementations of the subject technology may be implemented. The electronic system 1100, for example, can be a network device, a media converter, a desktop computer, a laptop computer, a tablet computer, a server, a phone, or generally any electronic device that is capable of communicating signals over a network and implementing an adaptive video player in the manner described above. Such an electronic system 1100 includes various types of computer readable media and interfaces for various other types of computer readable media. In one or more implementations, the electronic system 1100 is, or includes, one or more of server 112 and/or electronic device 120. The electronic system 1100 includes a bus 1108, one or more processing unit(s) 1112, a system memory 1104, a read-only memory (ROM) 1110, a permanent storage device 1102, an input device interface 1114, an output device interface 1106, and a network interface 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multicore processor in different implementations.

The ROM 1110 stores static data and instructions that are needed by the one or more processing unit(s) 1112 and other modules of the electronic system. The permanent storage device 1102, on the other hand, is a read-and-write memory device. The permanent storage device 1102 is a non-volatile memory unit that stores instructions and data even when the electronic system 1100 is off. One or more implementations of the subject disclosure use a mass-storage device (such as a solid-state drive, or a magnetic or optical disk and its corresponding disk drive) as the permanent storage device 1102.

Other implementations use a removable storage device (such as a flash memory drive, optical disk and its corresponding disk drive, external magnetic hard drive, etc.) as the permanent storage device 1102. Like the permanent storage device 1102, the system memory 1104 is a read-and-write memory device. However, unlike the permanent storage device 1102, the system memory 1104 is a volatile read-and-write memory, such as random access memory.

System memory 1104 stores any of the instructions and data that the one or more processing unit(s) 1112 needs at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input device interface 1114 and the output device interface 1106. The input device interface 1114 enables a user to communicate information and select commands to the electronic system. Input devices used with the input device interface 1114 include, for example, alphanumeric keyboards and pointing devices (also called "cursor control devices"). The output device interface 1106 enables, for example, the display of images generated by the electronic system 1100. Output devices used with the output device interface 1106 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks (not shown) through one or more network interfaces 1116. In this manner, the computer can be a part of one or more network of computers (such as a local area network (LAN), a wide area network (WAN), or an Intranet, or a network of networks, such as the Internet). Any or all components of the electronic system 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multicore processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

According to aspects of the subject technology, a method is provided that includes setting, by a controller, a first bit-rate level for a next video segment and comparing a fill level of a playback buffer to a first threshold. If the fill level of the playback buffer satisfies the first threshold, the first bit-rate level for the next video segment set by the controller is replaced by setting a second bit-rate level for the next video segment. A first request is issued to a server for the next video segment encoded at the first bit-rate level or, if the fill level of the playback buffer satisfies the first threshold, encoded at the second bit-rate level and downloading of the requested next video segment from the server and storing the next video segment in the playback buffer is initiated. The next video segment is decoded from the playback buffer for playback on a display device after the next video segment has been downloaded and stored in the playback buffer.

The method may further include comparing the fill level of the playback buffer to a second threshold and if the fill level of the playback buffer satisfies the second threshold, replacing the first bit-rate level for the next video segment set by the controller by setting a third bit-rate level for the next video segment. The first request to the server is issued for the next video segment encoded at the third bit-rate level if the fill level of the playback buffer satisfies the second threshold. The second threshold may be greater than the first threshold, and the fill level may satisfy the second threshold by exceeding the second threshold and satisfy the first threshold by being less than the first threshold. The third bit-rate level may be greater than the second bit-rate level. The second bit-rate level may be a lowest bit-rate level from a set of bit-rate levels at which the next video segment is encoded on the server, and the third bit-rate level may be a highest bit-rate level from the set of bit-rate levels at which the next video segment is encoded on the server. The fill level of the playback buffer may be determined prior to storing the next video segment in the playback buffer.

The method may further include stopping the downloading of the next video segment from the server before completion based on one or more network bandwidth conditions, comparing the fill level of the playback buffer to a third threshold, and if the fill level of the playback buffer satisfies the third threshold, changing a first playback speed set for the next video segment to a second playback speed. The method may further include setting a fourth bit-rate level for the next video segment and issuing a second request to the server for the next video segment encoded at the fourth bit-rate level, where the next video segment is decoded by the decoder for playback on the display device at the first playback speed set for the next video segment or, if the fill level of the playback buffer satisfies the third threshold, at the second playback speed.

The method may further include comparing the fill level of the playback buffer to a fourth threshold if the fill level of the playback buffer does not satisfy the third threshold, and if the fill level of the playback buffer satisfies the fourth threshold, changing the first playback speed for the next video segment to a third playback speed, where the fourth threshold is greater than the third threshold and the third playback speed is greater than the second playback speed. The method may further include determining if a current playback lag time is greater than zero, where the playback speed set for the next video segment is changed to the third playback speed if the fill level satisfies the fourth threshold and the current playback lag time is greater than zero.

The method may further include comparing the fill level of the playback buffer to a fifth threshold, wherein the fifth threshold is greater than the third threshold and less than the fourth threshold, determining if downloading a previous video segment was stopped, and if the fill level of the playback buffer satisfies the fifth threshold and downloading the previous video segment was stopped, changing the first playback speed set for the next video segment to the second playback speed. The playback speed may be reduced by the decoder inserting one or more frames into the next video segment using frame-rate conversion, and the playback speed may be increased by the decoder periodically dropping one or more frames from the next video segment. The method may further include applying pitch correction to an audio portion of the next video segment based on changes to the playback speed set for the next video segment.

According to aspects of the subject technology, a non-transitory computer-readable medium storing instructions which, when executed by one or more processors, cause the one or more processors to perform operations is provided. The operations include issuing a first request to a server for a next video segment encoded at a first bit-rate level, initiating downloading of the next video segment encoded at the first bit-rate level from the server and storing the next video segment in a playback buffer. The operations further include comparing a fill level of the playback buffer to a first threshold, if the fill level of the playback buffer satisfies the first threshold, changing a first playback speed set for the next video segment to a second playback speed, and decoding the next video segment from the playback buffer for playback at the first playback speed or, if the fill level of the playback buffer satisfies the first threshold, at the second playback speed on a display device after the next video segment has been downloaded and stored in the playback buffer.

The operations may further include comparing the fill level of the playback buffer to a second threshold, determining if a current playback lag time is greater than zero, and if the fill level of the playback buffer satisfies the second threshold and if the current playback lag time is greater than zero, changing the first playback speed set for the next video segment to a third playback speed, where the second threshold is greater than the first threshold and the third playback speed is greater than the second playback speed. The operations may further include comparing the fill level of the playback buffer to a third threshold, wherein the third threshold is greater than the first threshold and less than the second threshold, determining if downloading a previous video segment was stopped, and if the fill level of the playback buffer satisfies the third threshold and downloading the previous video segment was stopped, changing the first playback speed for the next video segment to the second playback speed.

The operations may further include stopping the downloading of the next video segment from the server before completion based on one or more network bandwidth conditions, setting the bit-rate level for the next video segment to a second bit-rate level, issuing a second request to the server for the next video segment encoded at the second bit-rate level, and initiating downloading the next video segment encoded at the second bit-rate level and storing the next video segment in the playback buffer.

The operations may further include setting, by a controller, the first bit-rate level for the next video segment, comparing the fill level of the playback buffer to a third threshold, and if the fill level of the playback buffer satisfies the third threshold, replacing the first bit-rate level for the next video segment set by the controller by setting a third bit-rate level for the next video segment, where the first request to the server is issued for the next video segment encoded at the third bit-rate level if the fill level of the playback buffer satisfies the third threshold.

The operations may further include comparing the fill level of the playback buffer to a fourth threshold greater than the third threshold, and if the fill level of the playback buffer satisfies the fourth threshold, replacing the bit-rate level for the next video segment set by the adaptive bit-rate controller by setting a fourth bit rate level for the next video segment greater than the third bit-rate level, where the first request to the server is issued for the next video segment encoded at the fourth bit-rate level if the fill level of the playback buffer satisfies the fourth threshold, and where the fill level satisfies the fourth threshold by exceeding the fourth threshold and satisfies the third threshold by being less than the third threshold.

According to aspects of the subject technology, an electronic device is provided that includes memory comprising a playback buffer, and a processor coupled to the memory. The processor is configured to set, by a controller, a first bit-rate level for a next video segment, compare a fill level of a playback buffer to a first threshold, and if the fill level of the playback buffer satisfies the first threshold, replace the first bit-rate level set for the next video segment by the controller by setting a second bit-rate level for the next video segment. The processor is further configured to issue a first request to a server for the next video segment encoded at the first bit-rate level or, if the fill level of the playback buffer satisfies the first threshold, encoded at the second bit-rate level, initiate downloading the next video segment from the server and storing the next video segment in a playback buffer, and compare the fill level of the playback buffer to a second threshold. If the fill level of the playback buffer satisfies the second threshold, a first playback speed set for the next video segment is changed to a second playback speed, and decode, by a decoder, the next video segment from the playback buffer for playback at the first playback speed on a display device or, if the fill level of the playback buffer satisfies the second threshold, at the second playback speed, after the next video segment has been downloaded and stored in the playback buffer.

The processor may be further configured to compare the fill level of the playback buffer to a third threshold greater than the first threshold, and if the fill level of the playback buffer satisfies the third threshold, replace the first bit-rate level for the next video segment set by the controller by setting a third bit-rate level for the next video segment greater than the second bit-rate level, where the fill level satisfies the third threshold by exceeding the third threshold and satisfies the second threshold by being less than the second threshold.

The processor may be further configured to stop the download of the next video segment from the server before completion based on one or more network bandwidth conditions, set a third bit-rate level for the next video segment, and issue a second request to the server for the next video segment encoded at the third bit-rate level, where the next video segment encoded at the third bit-rate level is downloaded and stored in the playback buffer and is decoded from the playback buffer for playback on the display device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedi-cated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. An electronic device, comprising:
memory comprising a playback buffer; and
a processor coupled to the memory and configured to:
    issue a first request to a server for a first video segment encoded at a first bit-rate level;
    stop downloading the first video segment encoded at the first bit-rate level from the server before the first video segment has finished being downloaded based on one or more conditions related to the download-ing of the first video segment;
    set a second bit-rate level for the first video segment different from the first bit-rate level;
    issue a second request to the server for the first video segment encoded at the second bit-rate level; and
    decode the first video segment for playback on a display device in response to the first video segment encoded at the second bit-rate level being down-loaded and stored in the playback buffer.

2. The electronic device of claim 1, wherein the second bit-rate level is lower than the first bit-rate level.

3. The electronic device of claim 1, wherein the second bit-rate level is determined based on one or more of a size of a portion of the first video segment downloaded before downloading was stopped, a size of the complete first video segment encoded at the first bit-rate level, network band-width experienced during downloading the first video seg-ment before downloading was stopped, or the first bit-rate level.

4. The electronic device of claim 1, wherein the one or more conditions related to the downloading of the first video segment include an elapsed downloading time of the first video segment encoded at the first bit-rate level, a remaining downloading time of the first video segment encoded at the first bit-rate level, network bandwidth experienced during the downloading of the first video segment encoded at the first bit-rate level, or an estimated size of the first video segment encoded at the second bit-rate level.

5. The electronic device of claim 1, wherein the processor is further configured to:

set the first bit-rate level based on a predicted network bandwidth and a current fill level of the playback buffer.

6. The electronic device of claim 5, wherein the processor is further configured to:

compare the fill level of the playback buffer to a first buffer threshold and to a second buffer threshold;

if the fill level of the playback buffer satisfies the first buffer threshold, replace the first bit-rate level with a highest bit-rate level from a set of bit-rate levels at which the first video segment is encoded on the server; and if the fill level of the playback buffer satisfies the second buffer threshold, replace the first bit-rate level with a lowest bit-rate level from the set of bit-rate levels.

7. The electronic device of claim 1, wherein the processor is further configured to:

compare a fill level of the playback buffer to a second buffer threshold and to a third buffer threshold;

determine if a current playback lag time is greater than zero;

if the fill level of the playback buffer satisfies the second buffer threshold, reduce a playback speed at which the downloaded first video segment is played back on the display device; and if the fill level of the playback buffer satisfies the third buffer threshold and the playback lag time is greater than zero, increase the playback speed at which the downloaded first video segment is played back on the display device, wherein the second buffer threshold is less than the third buffer threshold.

8. The electronic device of claim 7, wherein the processor is further configured to:

compare the fill level of the playback buffer to a fourth buffer threshold; and if the fill level of the playback buffer satisfies the fourth buffer threshold, reduce the playback speed at which the downloaded first video segment is played back on the display device, wherein the fourth buffer threshold is less than the second buffer threshold.

9. The electronic device of claim 7, wherein the playback speed is reduced by inserting one or more frames into the first video segment during playback, and the playback speed is increased by dropping one or more frames from the first video segment during playback.

10. The electronic device of claim 7, wherein the processor is further configured to apply pitch correction to an audio portion of the first video segment during playback based on changes to the playback speed of the first video segment.

11. A method, comprising:

issuing a first request to a server for a first video segment encoded at a first bit-rate level;

stopping downloading of the first video segment encoded at the first bit-rate level from the server before the first video segment has finished being downloaded and stored in a playback buffer based on one or more conditions related to the downloading of the first video segment;

setting a second bit-rate level for the first video segment different from the first bit-rate level;

issuing a second request to the server for the first video segment encoded at the second bit-rate level; and decoding the first video segment for playback on a display device after the first video segment encoded at the second bit-rate level has been downloaded and stored in the playback buffer.

12. The method of claim 11, wherein the second bit-rate level is lower than the first bit-rate level.

13. The method of claim 11, further comprising:

setting the first bit-rate level based on a predicted network bandwidth and a current fill level of the playback buffer.

14. The method of claim 13, further comprising:

comparing the fill level of the playback buffer to a first buffer threshold and to a second buffer threshold;

if the fill level of the playback buffer satisfies the first buffer threshold, replacing the first bit-rate level with a highest bit-rate level from a set of bit-rate levels at which the first video segment is encoded on the server; and if the fill level of the playback buffer satisfies the second buffer threshold, replacing the first bit-rate level with a lowest bit-rate level from the set of bit-rate levels.

15. The method of claim 11, further comprising:

comparing a fill level of the playback buffer to a second buffer threshold and to a third buffer threshold;

determining if a current playback lag time is greater than zero;

if the fill level of the playback buffer satisfies the second buffer threshold, reducing a playback speed at which the downloaded first video segment is played back on the display device; and if the fill level of the playback buffer satisfies the third buffer threshold and the playback lag time is greater than zero, increasing the playback speed at which the downloaded first video segment is played back on the display device, wherein the second buffer threshold is less than the third buffer threshold.

16. The method of claim 15, further comprising:

comparing the fill level of the playback buffer to a fourth buffer threshold; and if the fill level of the playback buffer satisfies the fourth buffer threshold, reducing the playback speed at which the downloaded first video segment is played back on the display device, wherein the fourth buffer threshold is less than the second buffer threshold.

17. A non-transitory computer-readable medium storing instructions which, when executed by one or more processors, cause the one or more processors to perform operations comprising:

setting a first bit-rate level based on a predicted network bandwidth and a current fill level of a playback buffer;

issuing a first request to a server for a first video segment encoded at the first bit-rate level;

stopping downloading the first video segment encoded at the first bit-rate level from the server before the first video segment has finished being downloaded and stored in the playback buffer based on one or more conditions related to the downloading of the first video segment;

setting a second bit-rate level for the first video segment different from the first bit-rate level, wherein the second bit-rate level is lower than the first bit-rate level;

issuing a second request to the server for the first video segment encoded at the second bit-rate level; and decoding the first video segment for playback on a display device after the first video segment encoded at the second bit-rate level has been downloaded and stored in the playback buffer.

18. The non-transitory computer-readable medium of claim 17, wherein the operations further comprise:

comparing the fill level of the playback buffer to a first buffer threshold and to a second buffer threshold;

if the fill level of the playback buffer satisfies the first buffer threshold, replacing the first bit-rate level with a highest bit-rate level from a set of bit-rate levels at which the first video segment is encoded on the server; and if the fill level of the playback buffer satisfies the second buffer threshold, replacing the first bit-rate level with a lowest bit-rate level from the set of bit-rate levels.

19. The non-transitory computer-readable medium of claim 17, wherein the operations further comprise:

comparing a fill level of the playback buffer to a second buffer threshold and to a third buffer threshold;

determining if a current playback lag time is greater than zero;

if the fill level of the playback buffer satisfies the second buffer threshold, reducing a playback speed at which the downloaded first video segment is played back on the display device; and if the fill level of the playback buffer satisfies the third buffer threshold and the playback lag time is greater than zero, increasing the playback speed at which the downloaded first video segment is played back on the display device, wherein the second buffer threshold is less than the third buffer threshold.

20. The non-transitory computer-readable medium of claim 19, wherein the operations further comprise:

comparing the fill level of the playback buffer to a fourth buffer threshold; and if the fill level of the playback buffer satisfies the fourth buffer threshold, reducing the playback speed at which the downloaded first video segment is played back on the display device, wherein the fourth buffer threshold is less than the second buffer threshold.

* * * * *